US012716493B2

(12) United States Patent
Holbrook et al.

(10) Patent No.: US 12,716,493 B2
(45) Date of Patent: Aug. 25, 2026

(54) SEALING GASKET

(71) Applicant: Edwards Limited, Burgess Hill (GB)

(72) Inventors: Alan Ernest Kinnaird Holbrook, Burgess Hill (GB); Jan Kolenyak, Lutin (CZ)

(73) Assignee: Edwards Limited, Burgess Hill (GB)

( * ) Notice: Subject to any disclaimer, the term of this patent is extended or adjusted under 35 U.S.C. 154(b) by 0 days.

(21) Appl. No.: 18/873,937

(22) PCT Filed: Aug. 30, 2023

(86) PCT No.: PCT/GB2023/052232
§ 371 (c)(1),
(2) Date: Dec. 11, 2024

(87) PCT Pub. No.: WO2024/062213
PCT Pub. Date: Mar. 28, 2024

(65) Prior Publication Data

US 2025/0361935 A1 Nov. 27, 2025

(30) Foreign Application Priority Data

Sep. 22, 2022 (GB) ...................................... 2213812
Jun. 8, 2023 (GB) ...................................... 2308566

(51) Int. Cl.
*F16J 15/10* (2006.01)
*F04C 25/02* (2006.01)
*F04C 27/00* (2006.01)

(52) U.S. Cl.
CPC ............. *F16J 15/104* (2013.01); *F04C 25/02* (2013.01); *F04C 27/00* (2013.01)

(58) Field of Classification Search
CPC .......... F16J 15/104; F04C 25/02; F04C 27/00
See application file for complete search history.

(56) References Cited

U.S. PATENT DOCUMENTS 6,572,351 B2 6/2003 Durand et al.
9,739,278 B2 8/2017 Holbrook et al.
(Continued)

FOREIGN PATENT DOCUMENTS

CN 112815092 A * 5/2021 ............... F16J 15/16
CN 113123958 A 7/2021
(Continued)

OTHER PUBLICATIONS

English Translation WO-2020229163-A1 (Year: 2020).*
(Continued)

*Primary Examiner* — Shafiq Mian
(74) *Attorney, Agent, or Firm* — Shumaker & Sieffert, P.A.

(57) ABSTRACT

A sealing gasket (20) for a vacuum pump comprising: a first sealing member (22) defining a closed shape (preferably a rounded square or rounded rectangle) and comprising: a first surface (30); a second surface (32) opposite the first surface (30); a first inner surface (34); and a first outer surface (36) opposite to the first inner surface (34), wherein the first inner surface (34) and the first outer surface (36) are disposed between the first surface (30) and the second surface (32); a second sealing member (24) defining a closed shape (preferably a rounded square) and comprising: a third surface (40); a fourth surface (42) opposite the third surface (40); a second inner surface (44); and a second outer surface (46) opposite to the second inner surface (44), wherein the second inner surface (44) and the second outer surface (46) are disposed between the third surface (40) and the fourth surface (42); a first longitudinal sealing member (26) connected between the first outer surface (36) and the second outer surface (46); and a second longitudinal sealing member (28) connected between the first outer surface (36) and the second outer surface (46).

11 Claims, 10 Drawing Sheets

(56) References Cited

U.S. PATENT DOCUMENTS

| | | | |
|---|---|---|---|
| 9,879,677 | B2 | 1/2018 | Kailasam et al. |
| 11,421,689 | B2 | 8/2022 | Schofield et al. |
| 2004/0017049 | A1 | 1/2004 | Fink |
| 2009/0243229 | A1 | 10/2009 | Yoshida |
| 2013/0249173 | A1 | 9/2013 | Yamamoto |
| 2016/0201671 | A1 | 7/2016 | Moeser et al. |
| 2017/0204858 | A1 | 7/2017 | Holbrook et al. |
| 2017/0204859 | A1 | 7/2017 | Holbrook et al. |
| 2020/0284252 | A1 | 9/2020 | Stark et al. |
| 2021/0340979 | A1 | 11/2021 | Shinoda et al. |
| 2022/0155014 | A1 | 5/2022 | Toro |
| 2022/0269257 | A1 | 8/2022 | Gordon et al. |
| 2023/0033204 | A1 | 2/2023 | Olivier et al. |
| 2023/0323888 | A1 | 10/2023 | Holbrook |

FOREIGN PATENT DOCUMENTS

| | | | | | |
|---|---|---|---|---|---|
| CN | 218094518 | U | | 12/2022 | |
| EP | 2650572 | A1 | | 10/2013 | |
| EP | 4027276 | A1 | | 7/2022 | |
| FR | 3112174 | A1 | | 1/2022 | |
| GB | 1206524 | A | | 9/1970 | |
| GB | 2559136 | A | | 8/2018 | |
| GB | 2575987 | A | * | 2/2020 | ............... F16J 15/06 |
| GB | 2591500 | A | | 8/2021 | |
| JP | S6058960 | U | | 4/1985 | |
| JP | H029975 | A | | 1/1990 | |
| JP | H0211766 | A | | 1/1990 | |
| JP | 2008298246 | A | | 12/2008 | |
| JP | 2011185224 | A | | 9/2011 | |
| JP | 2020070727 | A | | 5/2020 | |
| WO | 2011018598 | A2 | | 2/2011 | |
| WO | 2015175814 | A1 | | 11/2015 | |
| WO | 2016012758 | A1 | | 1/2016 | |
| WO | WO-2020229163 | A1 | * | 11/2020 | .............. F04C 25/02 |
| WO | 2022117607 | A1 | | 6/2022 | |
| WO | 2022179819 | A1 | | 9/2022 | |

OTHER PUBLICATIONS

English Translation CN 112815092 A (Year: 2021).*

Combined Search and Examination Report from counterpart GB Application No. 2308570.7, dated Dec. 5, 2023, 7 Pages.

International Search Report and Written Opinion of International Application No. PCT/GB2023/052232, dated Nov. 8, 2023, 13 Pages.

International Search Report and Written Opinion of International Application No. PCT/GB2023/052234, dated Nov. 6, 2023, 11 Pages.

International Search Report and Written Opinion of International Application No. PCT/GB2023/052235, dated Nov. 28, 2023, 12 Pages.

Search Report from counterpart GB Application No. 2213812.7, dated Mar. 20, 2023, 2 Pages.

Search Report from counterpart GB Application No. 2308577.2, dated Nov. 30, 2023, 2 Pages.

Office Action from U.S. Appl. No. 18/873,978 dated Oct. 27, 2025, p. 26.

Office Action from U.S. Appl. No. 18/873,984 dated Sep. 19, 2025, 12 pp.

Response to Office Action dated Sep. 19, 2025 from U.S. Appl. No. 18/873,984, filed Dec. 18, 2025, 10 pp.

Notice of Allowance from U.S. Appl. No. 18/873,978 dated Mar. 6, 2026, 9 pp.

Notice of Allowance from U.S. Appl. No. 18/873,984 dated Feb. 24, 2026, 7 pp.

Response to Office Action dated Oct. 27, 2025 from U.S. Appl. No. 18/873,978, filed Jan. 27, 2026, 14 pp.

* cited by examiner

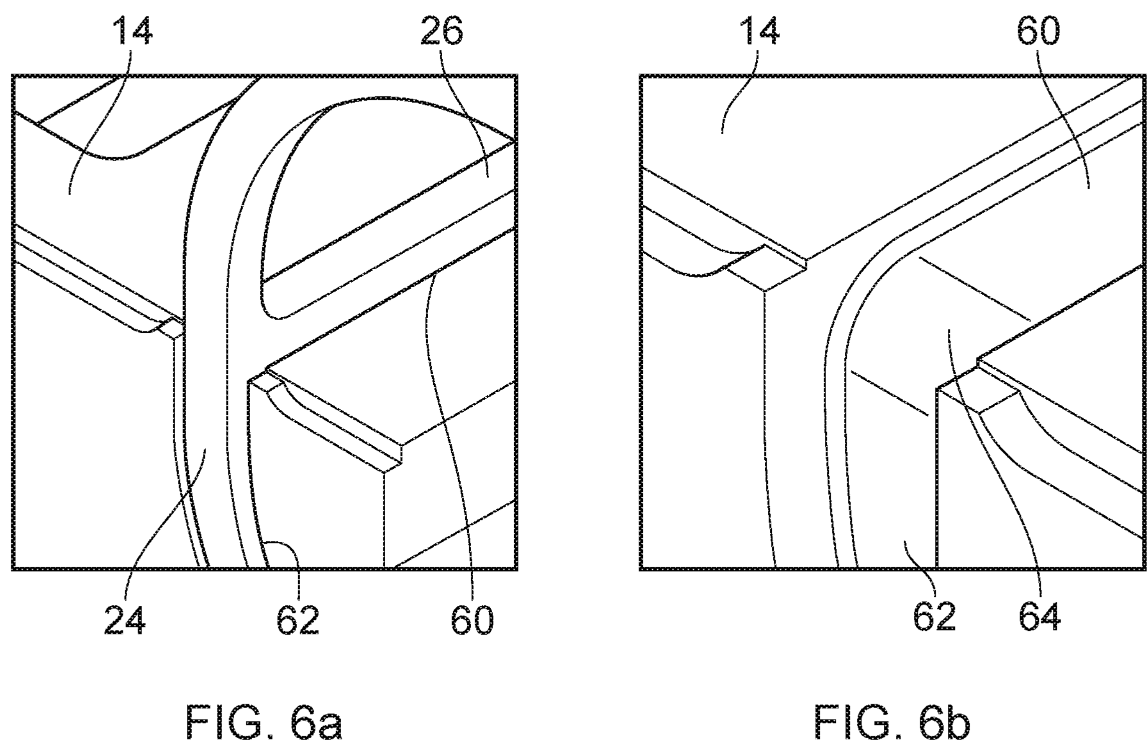
FIG. 6a
FIG. 6b
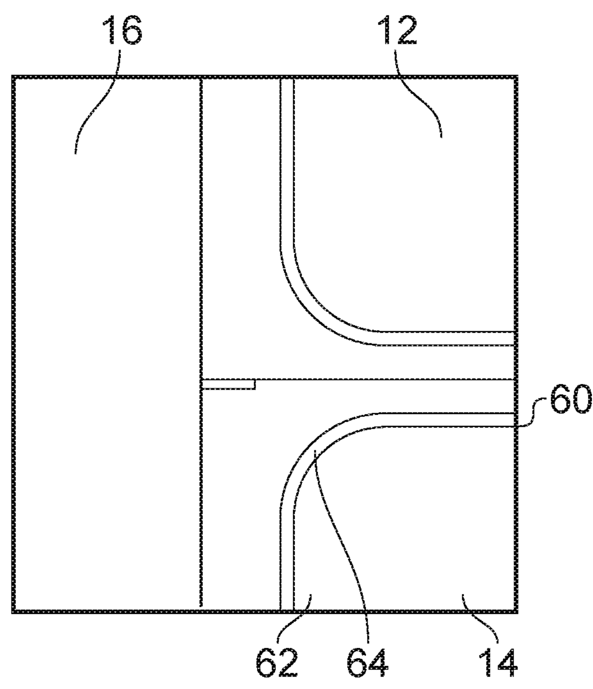
FIG. 6c

SEALING GASKET

This application is a national stage entry under 35 U.S.C. § 371 of International Application No. PCT/GB2023/052232, filed Aug. 30, 2023, which claims the benefit of GB Application No. 2213812.7, filed Sep. 22, 2022, and GB Application No. 2308566.5, filed Jun. 8, 2023, the entire contents of each of which are incorporated herein by reference.

TECHNICAL FIELD

The field of the disclosure relates to a sealing gasket for a vacuum pump, and a vacuum pump.

SUMMARY

Rotating machines, such as compressors or pumps, may be carefully designed and manufactured in order for the moving parts to cooperate with each other accurately. Providing effective seals to seal the machine tends to be problematic, particularly when fluid flow is encouraged by a pressure difference between the machine and ambient environment, such as in a vacuum pump. It is desired to provide an improved seal.

In an aspect, there is provided a sealing gasket for a vacuum pump. The sealing gasket comprises: a first sealing member defining a closed shape (e.g. a loop such as an annulus or a rounded square) and comprising: a first surface; a second surface opposite the first surface; a first inner surface (which may be a radially inner surface); and a first outer surface (which may be a radially outer surface) opposite to the first inner surface, wherein the first inner surface and the first outer surface are disposed between the first surface and the second surface; a second sealing member defining a closed shape and comprising: a third surface; a fourth surface opposite the third surface; a second inner surface (which may be a radially inner surface); and a second outer surface (which may be a radially outer surface) opposite to the second inner surface, wherein the second inner surface and the second outer surface are disposed between the third surface and the fourth surface; a first longitudinal sealing member connected between the first outer surface and the second outer surface; and a second longitudinal sealing member connected between the first outer surface and the second outer surface.

The sealing gasket may further comprise one or more curved surface portions and/or one or more planar surface portions disposed between one or more of the first or second sealing members and one or more of the longitudinal sealing members, each of the one or more curved surface portions and/or the one or more planar surface portions being located at an interface between the one or more of the first or second sealing members and the one or more longitudinal sealing members.

The sealing gasket may further comprise one or more curved surface portions and/or one or more planar surface portions disposed between one or more of the outer surfaces and one or more of the longitudinal sealing members, and located at interfaces between the one or more outer surfaces and the one or more longitudinal sealing members.

The sealing gasket may further comprise, at an interface between an outer surface and the longitudinal sealing member connected thereto, a continuous curved surface portion arranged to provide a smooth continuous transition between the outer surface and the longitudinal sealing member connected thereto.

The sealing gasket may further comprise, at an interface between a outer surface and the longitudinal sealing member connected thereto, a curved surface portion and a discontinuity, the curved surface portion and the discontinuity being disposed between the outer surface and the longitudinal sealing member connected thereto.

The sealing gasket may further comprise, at an interface between a outer surface and the longitudinal sealing member connected thereto, one or more discrete planar surface portions disposed between the outer surface and the longitudinal sealing member connected thereto. In some aspects, there may be only one discrete planar surface portion (e.g. a chamfer) disposed between the outer surface and the longitudinal sealing member connected thereto. In some aspects, there may be multiple discrete planar surface portions (i.e. a multi-faceted portion) disposed between the outer surface and the longitudinal sealing member connected thereto.

In a further aspect, there is provided a sealing gasket for a vacuum pump. The sealing gasket comprises: a first sealing member defining a closed shape; a second sealing member defining a closed shape; a first longitudinal sealing member connected between the first sealing member and the second sealing member; a second longitudinal sealing member connected between the first sealing member and the sealing member; and one or more curved surface portions and/or one or more planar surface portions disposed between one or more of the sealing members and one or more of the longitudinal sealing members, and located at one or more interfaces between the one or more sealing members and the one or more longitudinal sealing members.

The sealing may comprise, at an interface between a first or second sealing member and a longitudinal sealing member connected thereto, a continuous curved surface portion arranged to provide a smooth continuous transition between the first or second sealing member and a longitudinal sealing member connected thereto.

In any of the preceding aspects, the sealing gasket may be a one-piece gasket. The sealing gasket may be a moulded gasket. Some or all of the sealing gasket may have square or rectangular cross-section. The sealing gasket may be deformable. The sealing gasket may be made of or comprise an elastomer.

In any of the preceding aspects, the closed shape may be, for example, an annulus, a loop, a ring, or a rounded square (i.e. a square with rounded corners, e.g. substantially a squircle), or a rounded rectangle.

In any of the preceding aspects, the first sealing member may define a rounded square, i.e. a square with rounded corners, e.g. substantially a squircle. The first surface may be a rounded square shaped surface. The second surface may be a rounded square shaped surface. The first sealing member may comprise a first curved section, a second curved section, a third curved section, a fourth curved section, a first substantially straight section disposed between the first curved section and the second curved section, a second substantially straight section disposed between the second curved section and the third curved section, a third substantially straight section disposed between the third curved section and the fourth curved section, and a fourth substantially straight section disposed between the fourth curved section and the first curved section. The first longitudinal sealing member may be connected to the first curved section. The second longitudinal sealing member may be connected to the third curved section.

In any of the preceding aspects, the second sealing member may define a rounded square, i.e. a square with rounded corners, e.g. substantially a squircle. The third surface may be a rounded square shaped surface. The fourth surface may be a rounded square shaped surface. The second sealing member may comprise a fifth curved section, a sixth curved section, a seventh curved section, an eighth curved section, a fifth substantially straight section disposed between the fifth curved section and the sixth curved section, a sixth substantially straight section disposed between the sixth curved section and the seventh curved section, a seventh substantially straight section disposed between the seventh curved section and the eighth curved section, and an eighth substantially straight section disposed between the eighth curved section and the fifth curved section. The first longitudinal sealing member may be connected to the fifth curved section. The second longitudinal sealing member may be connected to the seventh curved section.

In any of the above aspects, the first sealing member may be an annular sealing member. In any of the above aspects, the first surface may be an annular surface. In any of the above aspects, the second surface may be an annular surface.

In any of the above aspects, the second sealing member may be an annular sealing member. In any of the above aspects, the third surface may be an annular surface. In any of the above aspects, the fourth surface may be an annular surface.

In a further aspect, there is provided a vacuum pump, comprising: shell stators defining at least one pumping chamber; end pieces mountable at either end of the shell stator; and the sealing gasket of any preceding aspect.

The sealing gasket may be disposed in one or more seal grooves formed in one or more of the shell stators and/or one or more of the end pieces.

The first sealing member may be disposed in a first seal groove. The first seal groove may define a closed shape selected from the group of closed shapes consisting of an annulus, a circle, an oval, an ellipse, a stadium, a rounded square, a rounded rectangle, a rounded polygon, and a squircle. The first seal groove may be defined in end portions of the shell stators, and/or an end piece. The first curved section may be disposed in a first substantially straight portion of the first seal groove. The second curved section may be disposed in a second substantially straight portion of the first seal groove. The third curved section may be disposed in a third substantially straight portion of the first seal groove. The fourth curved section may be disposed in a fourth substantially straight portion of the first seal groove. The first substantially straight section may be disposed in a first curved portion of the first seal groove. The second substantially straight section may be disposed in a second curved portion of the first seal groove. The third substantially straight section may be disposed in a third curved portion of the first seal groove. The fourth substantially straight section may be disposed in a fourth curved portion of the first seal groove.

The second sealing member may be disposed in a second seal groove. The second seal groove may define a closed shape selected from the group of closed shapes consisting of an annulus, a circle, an oval, an ellipse, a stadium, a rounded square, a rounded rectangle, a rounded polygon, and a squircle. The second seal groove may be defined in end portions of the shell stators, and/or an end piece. The fifth curved section may be disposed in a first substantially straight portion of the second seal groove. The sixth curved section may be disposed in a second substantially straight portion of the second seal groove. The seventh curved section may be disposed in a third substantially straight portion of the second seal groove. The eighth curved section may be disposed in a fourth substantially straight portion of the second seal groove. The fifth substantially straight section may be disposed in a first curved portion of the second seal groove. The sixth substantially straight section may be disposed in a second curved portion of the second seal groove. The seventh substantially straight section may be disposed in a third curved portion of the second seal groove. The eighth substantially straight section may be disposed in a fourth curved portion of the second seal groove.

In a further aspect, there is provided a shell stator for a vacuum pump, The shell stator comprises: a first sealing groove disposed along a joining surface of the shell stator, the joining surface being for receiving a further shell stator thereby to define at least one pumping chamber; and a second sealing groove disposed in an end surface of the shell stator, the end surface being for receiving an end piece; wherein the first and second sealing grooves are connected at an edge of the shell stator via a transitional groove portion that comprises one or more curved surface portions and/or one or more planar surface portions.

The first and second sealing grooves may be connected at the edge of the shell stator via a multi-faceted transitional groove portion comprising multiple planar surface portions.

The first and second sealing grooves may be connected at the edge of the shell stator via a chamfered transitional groove portion comprising only a single planar surface portion.

The first and second sealing grooves may be connected at the edge of the shell stator via a continuous transitional groove portion comprising only a continuous curved surface portion.

The first and second sealing grooves may be connected at the edge of the shell stator via a transitional groove portion comprising a curved surface portion and a discontinuity. The discontinuity may be disposed between the curved surface portion and either the first or second sealing groove.

The first and second sealing grooves may be connected at the edge of the shell stator via a transitional groove portion comprising a curved surface portion and a planar surface portion. The planar surface portion may be disposed between the curved surface portion and either the first or second sealing groove.

The first and second sealing grooves may be connected at the edge of the shell stator via a transitional groove portion comprising a curved surface portion and two planar surface portions. Each planar surface portion may be disposed between the curved surface portion and a respective one of the first and second sealing grooves.

In a further aspect, there is provided a shell stator for a vacuum pump. The shell stator comprises: a joining surface of the shell stator, the joining surface being for receiving a further shell stator thereby to define at least one pumping chamber; a sealing groove disposed in an end surface of the shell stator, the end surface being for receiving an end piece; and a transitional groove portion disposed between the joining surface and the sealing groove at an edge of the shell stator, the transitional groove portion comprising one or more curved surface portions and/or one or more planar surface portions.

The transitional groove portion may be a multi-faceted transitional groove portion comprising multiple planar surface portions.

The transitional groove portion may be a chamfered transitional groove portion comprising only a single planar surface portion.

The transitional groove portion may be a continuous transitional groove portion comprising only a continuous curved surface portion.

The transitional groove portion may comprise a curved surface portion and a discontinuity. The discontinuity may be disposed between the curved surface portion and either the sealing groove or the joining surface.

The transitional groove portion may comprise a curved surface portion and a planar surface portion. The planar surface portion may be disposed between the curved surface portion and either the sealing groove or the joining surface.

The transitional groove portion may comprise a curved surface portion and two planar surface portions. Each planar surface portion may be disposed between the curved surface portion and a respective one of the sealing groove and the joining surface.

In a further aspect, there is provided a vacuum pump comprising: shell stators defining at least one pumping chamber; end pieces mountable at either end of the shell stator; and a sealing gasket disposed between the shell stators and the end pieces. One or more of the shell stators is a shell stator according to any of the preceding aspects. For example, both of the shell stators may be in accordance with one of the proceeding aspects, e.g., different aspects. The sealing gasket may be in accordance with any of the preceding aspects.

BRIEF DESCRIPTION OF DRAWINGS

The present disclosure will now be described, by way of example only, with reference to the accompanying drawings.

FIGS. 6*a-c* are schematic illustrations (not to scale) showing further detail of the sealing gasket incorporated into the housing in the vicinity of a T-joint.

DETAILED DESCRIPTION

Figure 1:
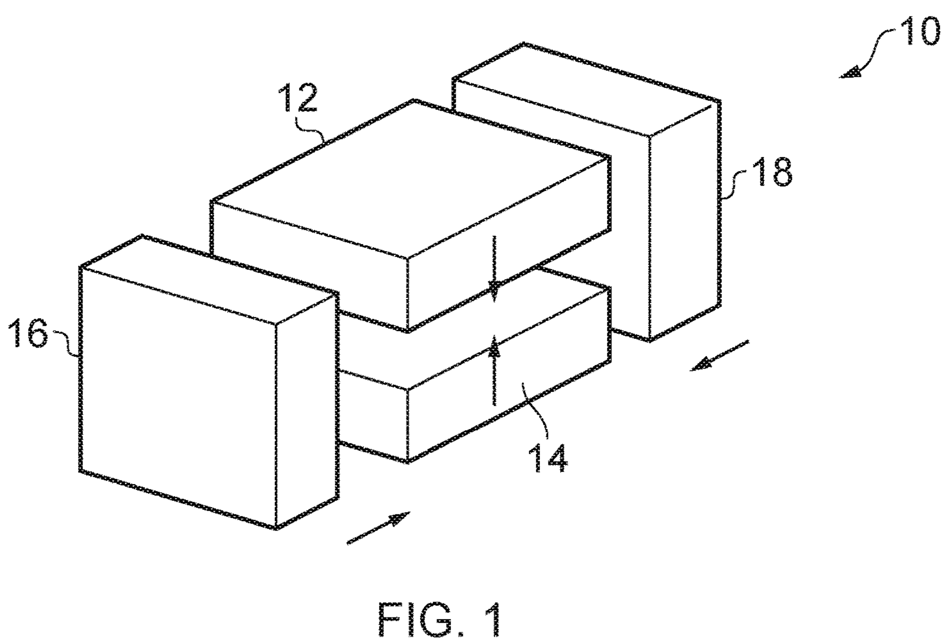
FIG. 1 is a schematic illustration (not to scale) showing a housing of a vacuum pump.

FIG. 1 is a schematic illustration (not to scale) showing a housing 10 of a vacuum pump, according to one example. The housing 10 comprises a pair of shell stators 12, 14 and a pair of end plates 16, 18. The shell stators 12, 14 define recesses which receive components of the vacuum pump. The shell stators 12, 14 are brought together to retain the components in those recesses. The end plates 16, 18 are then brought to retain the shell stators 12, 14. This provides for particularly convenient assembly of the vacuum pump.

In other words, the housing 10 of the vacuum pump may be formed from multiple component parts, including shells 12, 14 and end plates 16, 18 which may be sealed upon assembly. In the arrangement shown in FIG. 1, the stator is formed by bringing together the two housing parts or shells 12, 14 which are then retained between the pair of end plates 16, 18.

As will be explained in more detail below, in this example, to adequately seal the shell stators 12, 14 together, one or more (e.g. two) longitudinal seals are located along the joining faces of the shell stators 12, 14. Also, to ensure adequate sealing between the shell stators 12, 14 and the respective end plates 16, 18, a pair of annular seals is located between the end plates 16,18 and the shell stators 12, 14.

Figure 2:
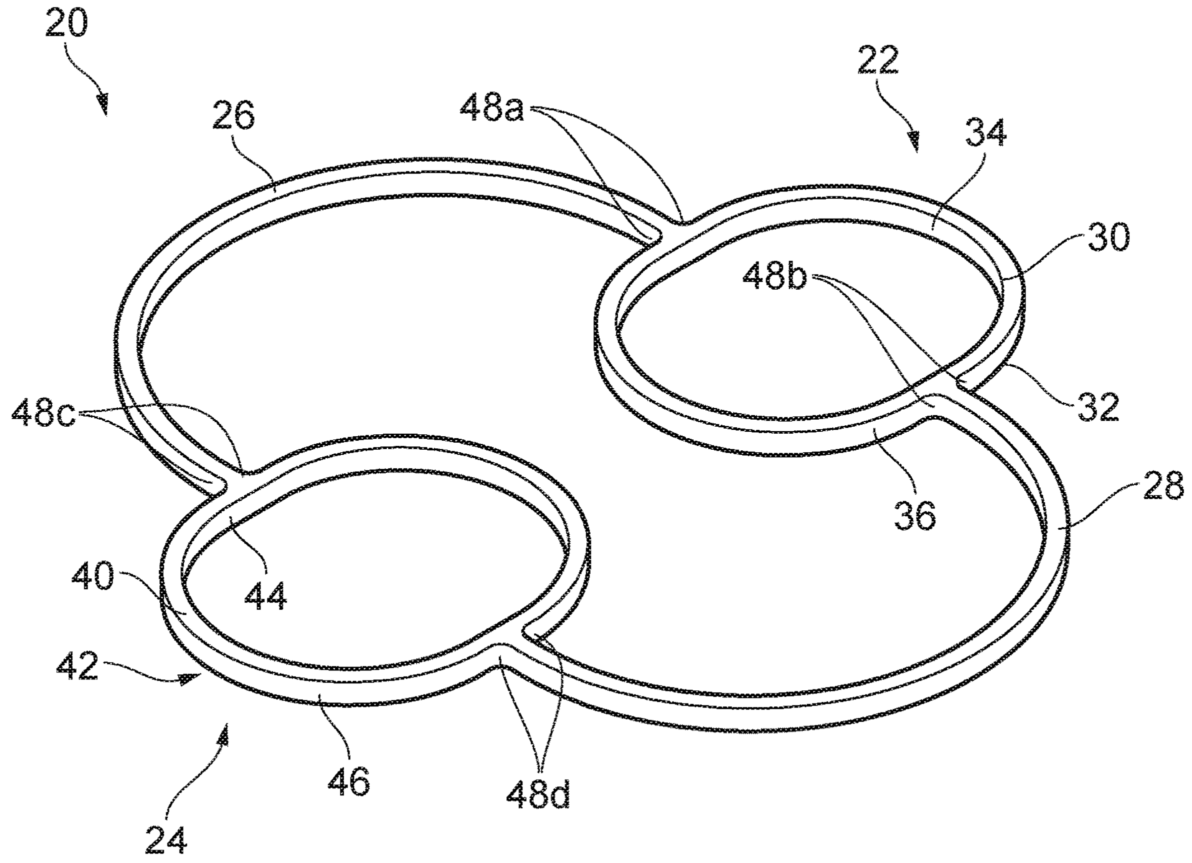
FIG. 2 is a schematic illustration (not to scale) of a sealing gasket.

FIG. 2 is a schematic illustration (not to scale) of a sealing gasket 20 for sealing the housing 10, according to one example.

The sealing gasket 20 comprises a first approximately annular sealing member 22, a second approximately annular sealing member 24, a first longitudinal sealing member 26, and a second longitudinal sealing member 28.

The first annular sealing member 22 comprises a first annular surface 30, a second annular surface 32 opposite the first annular surface 30, a first radially inner surface 34, and a first radially outer surface 36 opposite to the first radially inner surface 34. The first radially inner surface 34 and the first radially outer surface 36 are disposed between the first annular surface 30 and the second annular surface 32.

The second annular sealing member 24 comprises a third annular surface 40, a fourth annular surface 42 opposite the third annular surface 40, a second radially inner surface 44, a second radially outer surface 46 opposite to the second radially inner surface 44. The second radially inner surface 44 and the second radially outer surface 46 are disposed between the third annular surface 40 and the fourth annular surface 42.

The first longitudinal sealing member 26 is connected or attached between the first radially outer surface 36 (of the first annular sealing member 22) and the second radially outer surface 46 (of the second annular sealing member 24).

The second longitudinal sealing member 28 is connected or attached between the first radially outer surface 36 (of the first annular sealing member 22) and the second radially outer surface 46 (of the second annular sealing member 24).

The second longitudinal sealing member 28 is arranged opposite to the first longitudinal sealing member 26. That is to say, the second longitudinal sealing member 28 is connected to the first and second annular sealing members 22, 24 and at an opposite side of the first and second annular sealing members 22, 24 to the side at which the first longitudinal sealing member 26 is connected to the first and second annular sealing members 22, 24.

The first annular seal member 22 is a ring-shaped sealing member. The first annular seal member 22 has a square or rectangular cross-section.

The second annular seal member 24 is a ring-shaped sealing member. The second annular seal member 24 has a square or rectangular cross-section.

The first longitudinal sealing member 26 may be an O-ring cord. The first longitudinal sealing member 26 has a square or rectangular cross-section.

The second longitudinal sealing member 28 may be an O-ring cord. The second longitudinal sealing member 28 has a square or rectangular cross-section.

In this example, the sealing gasket 20 is a continuous one-piece sealing gasket.

In this example, the sealing gasket comprises curved surface portions 48*a-d* at the interfaces between the annular sealing members 22, 24 and the longitudinal sealing members 26, 28. In particular, there are curved surface portions 48*a* between the first radially outer surface 36 and the first longitudinal sealing member 26 at the interface between the first annular sealing member 22 and the first longitudinal sealing member 26. Also, there are curved surface portions 48*b* between the first radially outer surface 36 and the second longitudinal sealing member 28 at the interface between the first annular sealing member 22 and the second longitudinal sealing member 28. Also, there are curved surface portions 48*c* between the second radially outer surface 46 and the first longitudinal sealing member 26 at the interface between the second annular sealing member 24 and the first longitudinal sealing member 26. Also, there are curved surface portions 48*d* between the second radially outer surface 46 and the second longitudinal sealing member 28 at the interface between the second annular sealing member 24 and the second longitudinal sealing member 28.

In this example, the curved surface portions 48*a-d* tend to provide the radially outer surfaces 36, 46 of the annular sealing members 22, 24 are continuous with surfaces of the longitudinal sealing members 26, 28. There are smooth, continuous transitions between the radially outer surfaces 36, 46 of the annular sealing members 22, 24 and the longitudinal sealing members 26, 28. The curved surface portions 48*a-d* smooth the transitions, and moreover provide a continuous transition, between the radially outer surfaces 36, 46 of the annular sealing members 22, 24 and the longitudinal sealing members 26, 28.

The sealing gasket 20 is made of a deformable or flexible material, such as an elastomer material (e.g. a fluoroelastomers (FKM/FPM) or a perfluoroelastomer (FFKM)) or silicon, such that the sealing gasket 20 is deformable or flexible. Thus, the sealing gasket 20 may be deformed into a desired shape or configuration suitable for use as a seal for the housing 10.

Figure 3:
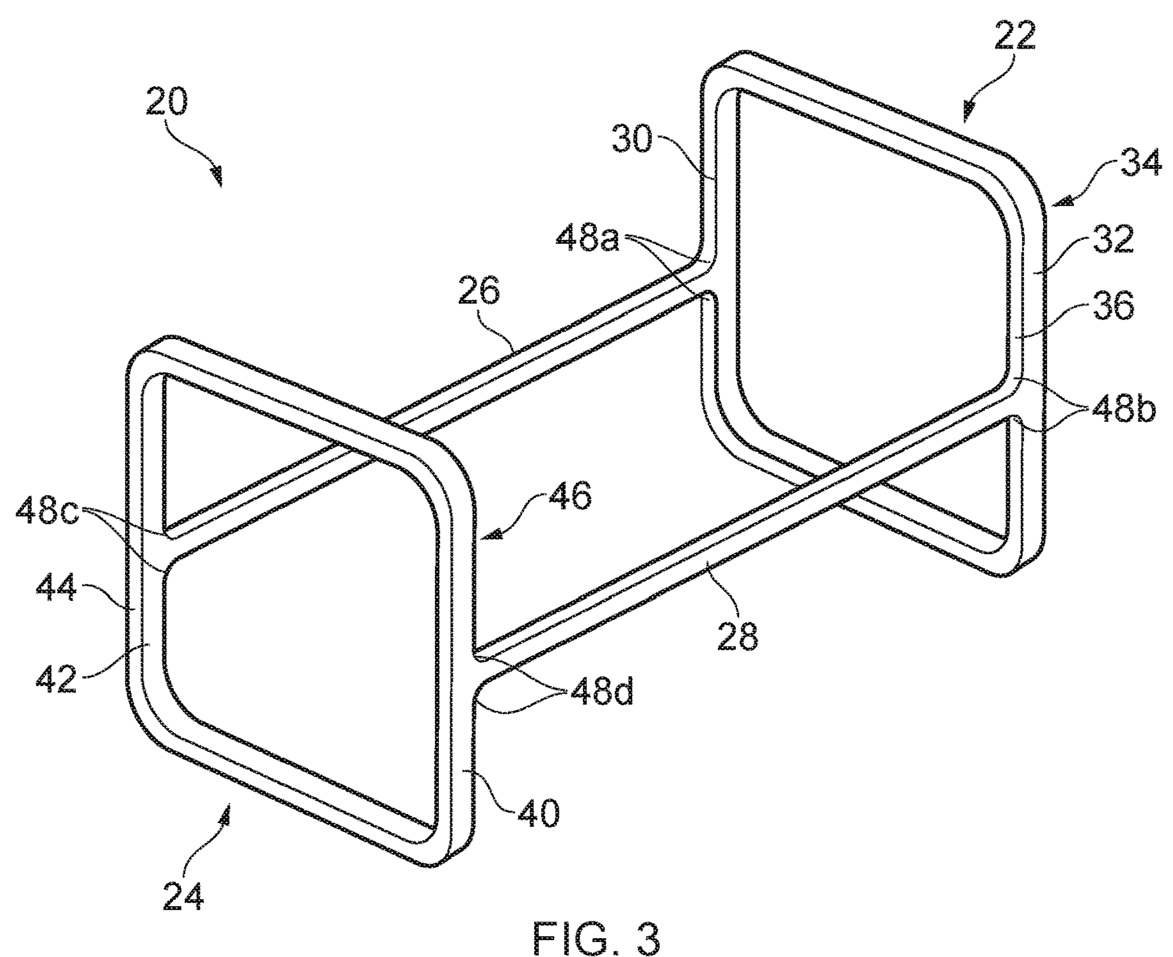
FIG. 3 is a further schematic illustration (not to scale) of the sealing gasket.

FIG. 3 is a schematic illustration (not to scale) showing the sealing gasket 20 that has been deformed into a configuration that may be suitable for sealing the housing 10.

In this configuration, the annular sealing members 22, 24 are square ring-shaped members with curved corners. The configuration has major faces (which are the first radially inner surface 34 and the first radially outer surface 36 of the first annular sealing member 22, and the second radially inner surface 44 and the second radially outer surface 46 of the second annular sealing member 24) which, in use, abut against major faces of the end plates 16, 18 and the adjacent faces of the shell stators 12, 14. In this example, the annular sealing members 22, 24 have substantially planar, axially outer faces, provided by the first radially inner surface 34 and the second radially inner surface 44 respectively. The annular sealing members 22, 24 have substantially planar, axially inner faces, provided by the first radially outer surface 36 and the second radially outer surface 46 respectively. The longitudinal sealing members 26 are connected between the facing axially inner faces of the annular sealing members 22, 24 (i.e., between the first radially outer surface 36 and the second radially outer surface 46). The annular sealing members 22, 24 have substantially constant thicknesses.

Figure 4:
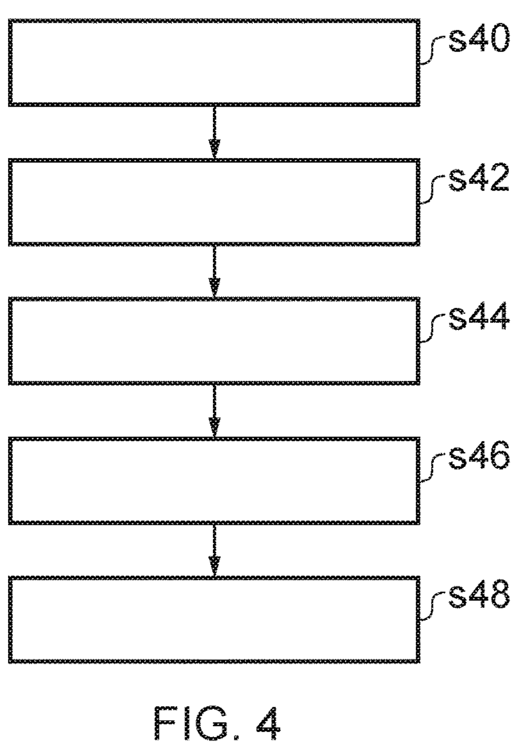
FIG. 4 is a process flow chart showing certain steps of a method of incorporating the sealing gasket into the housing.

FIG. 4 is a process flow chart showing certain steps (s40-s48) of a method of fitting, installing, or incorporating the sealing gasket 20 into the housing 10.

Figure 5:
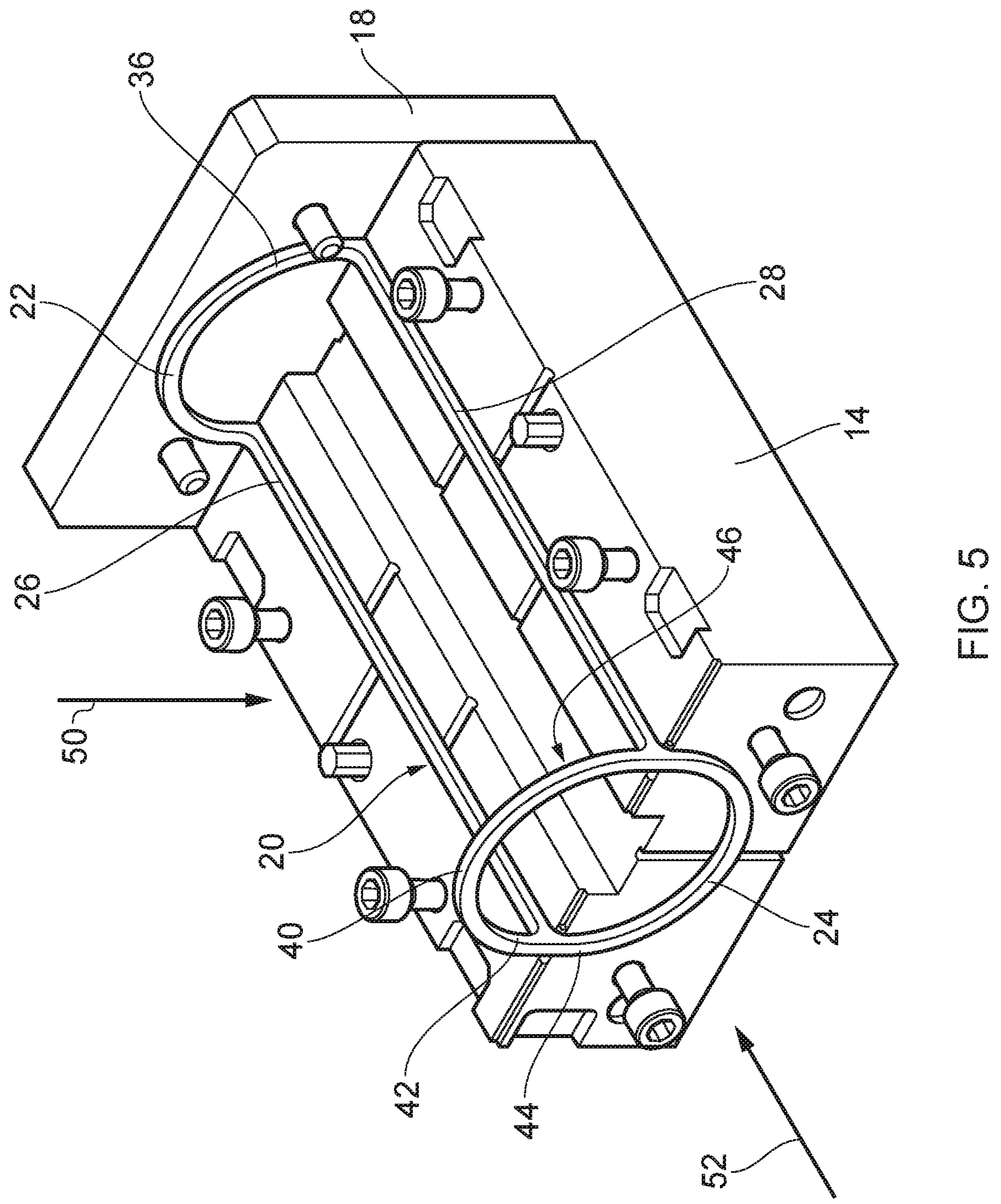
FIG. 5 is a schematic illustration (not to scale) showing sealing gasket incorporated into the housing.

FIG. 5 is a schematic illustration (not to scale) illustrating the incorporation of the sealing gasket 20 into the housing 10, useful in understanding the process of FIG. 4.

At step s40, the shell stator 14 is provided, into which components (not shown) of the vacuum pump may be assembled.

At step s42, the sealing gasket 20 is positioned relative to the shell stator 14 such that the first and second longitudinal sealing members 26, 28 are located along the joining face of shell stator 14, typically in seal grooves extending along the joining face of shell stator 14. This may be as depicted in FIG. 5.

At step s44, the shell stator 12 is brought into close contact with the longitudinal sealing members 26, 28.

Referring to FIG. 5, the shell stator 12 may be moved onto the longitudinal sealing members 26, 28 towards the joining face of shell stator 14, as indicated in FIG. 5 by an arrow and the reference numeral 50.

At step s46, the shell stators 12, 14 are clamped together, which compresses the longitudinal sealing members 26, 28.

Thus, after step s46, the annular sealing members 22, 24 tend to extend or protrude axially from the axial ends of the assembled together shell stators 12, 14.

At step s48, the end plates 16, 18 are brought together to compress the annular seals 26, 28 in the axial (i.e. longitudinal) direction.

The annular sealing members 22, 24 may be located in annular seal grooves located in the shell stators 12, 14 and/or the end plates 16, 18.

Referring to FIG. 5, the end plate 18 is shown having been moved onto the first annular sealing member 22 at a first end of the assembled together shell stators 12, 14. The end plate 16 may be moved onto the second annular sealing member 24 at a second end (opposite to the first end) of the assembled together shell stators 12, 14, as indicated in FIG. 5 by an arrow and the reference numeral 52.

Thus, a method of fitting, installing, or incorporating the sealing gasket 20 into the housing 10 is provided.

Vacuum pumps which have an axial split-line along the stators typically include a seal at each end of the split-line, which is referred to as a T joint. Examples provide a sealing gasket, e.g. a single piece elastomer gasket, for providing a T-joint sealing arrangement for metal, plated or coated clam pumps.

FIGS. 6*a-c* are schematic illustrations (not to scale) showing further detail of the sealing gasket 20 incorporated into the housing 10 in the vicinity of a T-joint. Although only one of the T-joints are depicted in FIGS. 6*a-c*, it will be appreciated by those skilled in the art that corresponding or similar features may be present at the location of the other T-joints of the assembly, and in the other shell stator 12.

In particular, FIG. 6*a* shows the sealing gasket 20 incorporated into the housing 10 in the vicinity of the T-joint. FIG. 6*b* shows the shell stator 14 in the vicinity of the T-joint (i.e. the same region as FIG. 6*a*, with the sealing gasket 20 omitted). FIG. 6*c* shown a side view cross section of the portion of the shell stator 14 shown in FIG. 6*b*.

In this example, the shell stator 14 comprises a first seal groove 60 extending along the (upper) joining face of shell stator 14 and a second seal groove 62 extending across an end surface of the shell stator 14.

In this example, the sealing gasket 20 is arranged such that a longitudinal sealing member (in this case, the first longitudinal sealing member 26) is located in the first seal groove 60, and such that an annular sealing member (in this case, the second annular sealing member 24) is located in the second seal groove 62.

As shown in FIGS. 6*b* and 6*c*, in this example, the shell stator 14 comprises curved surface portions 64 at the interfaces between the first seal groove 60 and the second seal groove 62. The curved surface portions 64 of this example may be considered to be transitional groove portions between the first seal groove 60 and the second seal groove 62.

In this example, the curved surface portion 64 tends to provide that the recessed surfaces (e.g. the flat bottoms) of the seal grooves 60, 62 are continuous with each other. There is a smooth, continuous transition between the first and second seal grooves 60, 62. The curved surface portion 64 provides a smooth continuous transition between the seal grooves 60, 62.

Preferably, the curved surface portions 64 between the seal grooves 60, 62 are complimentary or conform to the respective curved surface portions 48*a-d* of the sealing gasket 20. This tends to provide improved contact between the sealing gasket and the housing 10, and thus improved sealing.

Advantageously, the rounded or curved edge/surfaces 64 between the gasket groove (i.e. the first seal groove 60) and the annular seal groove (i.e. the second seal groove 62) tends to allows the sealing gasket to distort or flow around the edge without losing firm contact with the sealing surfaces. The arrangement tends to be tolerant of many compression scenarios. Further, the curved surfaces 64, 48*a-d* tend to eliminate sharp edges and create a single continuous tool path for gasket and annular seal grooves. The sealing gasket 20 tends to become self-aligning regardless of groove depths.

The sealing gasket tends to be easy to install into a housing or a vacuum pump.

Advantageously, the sealing gasket described herein tends to be relatively easy to produce or manufacture compared to conventional sealing assemblies. For example, the sealing gasket tends to be relatively easy to produce via moulding. For example, the sealing gasket can be moulded, in a mould, as a single-piece, as a substantially planar or flat item (as shown in FIG. 2 and described in more detail earlier above), and then deformed or manipulated into a desired shape or configuration (e.g., such as that shown in FIG. 3 and described in more detail earlier above). Moulding may be performed using a mould tool comprising a first part comprising a recess that is the desired shape of the sealing gasket; a substantially planar second part can be placed over the recess in the first part thereby to define a mould cavity in which the sealing gasket can be formed. Advantageously, the sealing gasket formed in this way tends not to have a parting line (where the two different side of the mould come together). Thus, the potential for separation of the sealing gasket tends to be greatly reduced. Moreover, any mould flash present on the moulded sealing gasket tends to be restricted to non-critical areas of the sealing gasket, such as extending outwards from the upper surface of the sealing gasket when in the orientation of FIG. 2). This tends to improve robustness and stability of the sealing gasket.

Conventionally, the separation of T-joint sealing surfaces can occur when the compressions of the gasket and annular seal are unbalanced. This separation can cause a leak and can occur during assembly or by thermal expansion of the seals. Also, conventionally, sharp edges on the ends of the gasket grooves are difficult to manufacture and can cut the annular seals, causing leaks. Also, conventional complex gasket profiles of current designs can have irregular distortion, which can cause leakage. The above described methods and apparatuses advantageously tends to address these problems.

Advantageously, the substantially constant or uniforms cross-sectional of the above-described sealing gasket tends to lead to reduced distortion, making the T-seal more tolerant of a wide compression range and reducing leaks.

The above-described sealing gasket tends to facilitate the use of T-seals to a higher temperature, for example up to 300° C.

The sealing gasket can be designed slightly shorter than the longitudinal grooves in the shell stators (i.e. the gasket grooves) so that it has a low tension during assembly. This tends to make the sealing gasket self-positioning regardless of the annular groove depths.

The width/thickness of the sealing gasket may be constant in the T-seal region, which tends to lead to reduced distortion. This tends to make the T-seal more tolerant of a wide compression range, which reduces leaks. The width/thickness of the sealing gasket can also be a constant width throughout the whole sealing gasket.

Advantageously, it tends to be possible to mould the sealing gasket on its side in one plane (i.e. in the configuration of FIG. 2. This tends to achieve a continuous sealing surface from the side walls of the mould tool, without any split-lines, which ensures a high integrity sealing surface. This one-piece seal shape tends to be reconfigurable to fit the seal housing by using bending only, without twisting of any section of the seal.

It will be appreciated that the cord and the gasket can have different shapes or thicknesses to suit the arrangement of the housing.

In the above examples, the sealing gasket is a continuous one-piece sealing gasket. However, in other examples, the sealing gasket comprises multiple separate parts that are joined together. The multiple parts may be joined together by any joining means or methods, such as using an adhesive, fusion, or via an interference fit.

In the above examples, the sealing gasket has substantially constant cross-section over its parts. However, in other examples, the sealing gasket has non-constant cross-section.

In the above examples, the sealing gasket has square or rectangular cross-section. However, in other examples, some or all of the sealing gasket has an alternative cross-section other than square or rectangular, such as circular, triangular, oval, etc.

In the above examples, the sealing gasket may be made of an elastomer. In some examples, the sealing gasket may be made of a different, deformable material, for example, a metal.

Although the major faces of the sealing gasket in the above examples are substantially planar, it will be appreciated that they may be any shape which is suitable for engaging with the major faces of the end plates and the adjacent faces of the shell stators.

In the above examples, the sealing gasket comprises curved surface portions at the interfaces between the annular sealing members and the longitudinal sealing members. These curved surface portions provide continuous transitions between the annular sealing members and the longitudinal sealing members. Similarly, one or both of the shell stators comprise curved surface portions between the longitudinal gasket seal groove and the annular seal grooves. However, in other examples, the interfaces between the annular sealing members and the longitudinal sealing members and/or the interfaces between the stator seal grooves in a stator part are not curved and/or not continuous.

Figure 7A:
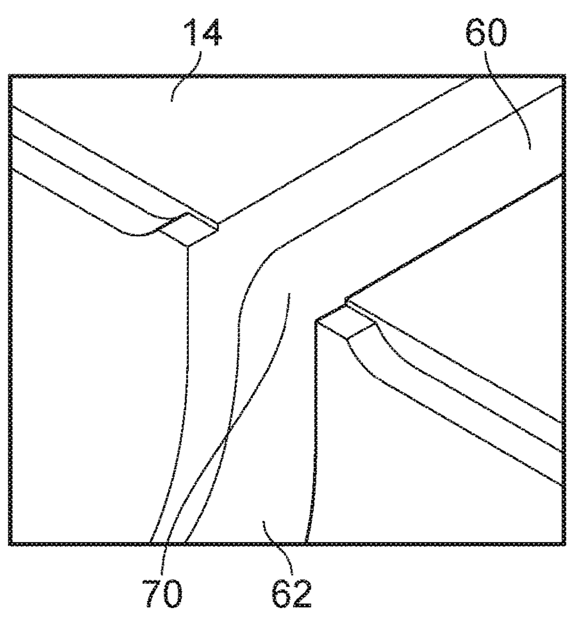
FIGS. 7*a* and 7*b* are schematic illustrations (not to scale) showing a portion of an alternative shell stator for the housing.
Figure 7B:
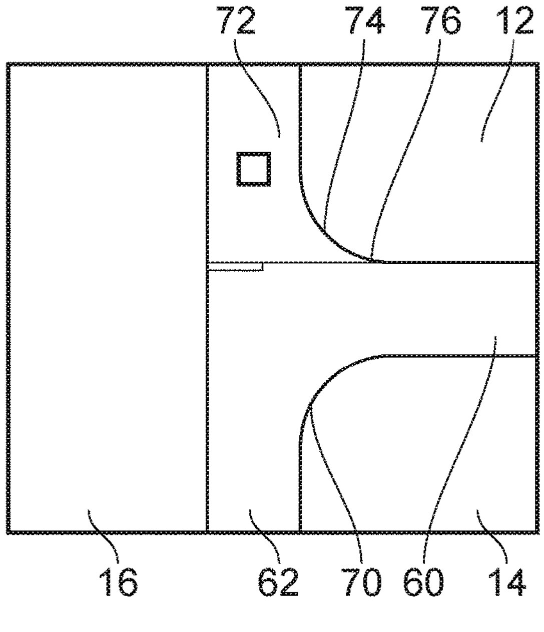

As a first example, FIGS. 7*a* and 7*b* illustrate the shell stators 12, 14 in accordance with an alternative example.

In this example, the shell stator 14 comprises a curved surface portion 70 at the interfaces between the first seal groove 60 and the second seal groove 62. The curved surface portion 70 provides a degree of continuity between the recessed surfaces (e.g. the flat bottoms) of the seal grooves 60, 62.

Also in this example, the shell stator 12 comprises a seal groove 72 at its end face for receiving an annular sealing member. When the shell stators 12, 14 are assembled together, seal grooves 62 and 72 form an annular sealing groove for receiving an annular sealing member 22, 24 of the sealing gasket 20. The seal groove 72 comprises a curved surface portion 74 at the interface between the seal groove 72 and the joining face of the shell stator 12 (i.e. the face of the shell stator 12 that joins to/faces the shell stator 14). In addition, there is a discontinuity or edge 76 disposed between the curved surface portion 74 and the joining face of the shell stator 12. This discontinuity or edge 76 tends to facilitate or enable omission of a sealing groove in the joining surface of the shell stator 12. Thus, manufacture of the shell stator 12 tends to be facilitated.

The discontinuity or edge 76 tends to provide improved contact between the sealing gasket 20 and the housing 10, and thus improved sealing.

Figure 8A:
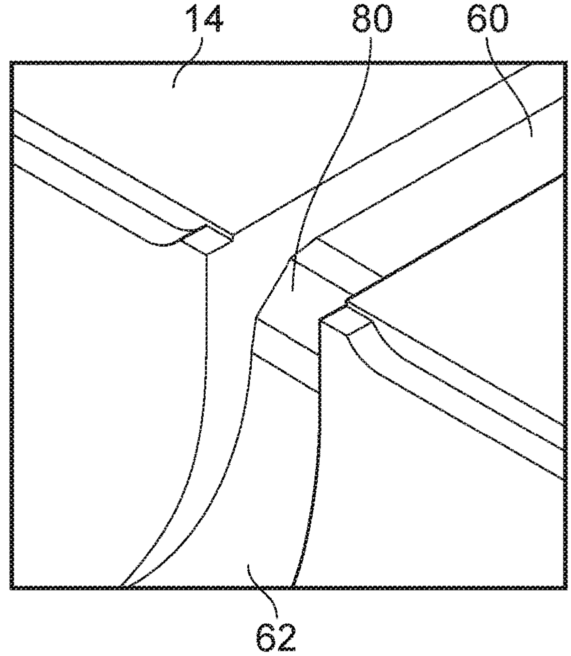
FIGS. 8*a* and 8*b* are schematic illustrations (not to scale) showing a portion of an alternative shell stator for the housing.
Figure 8B:
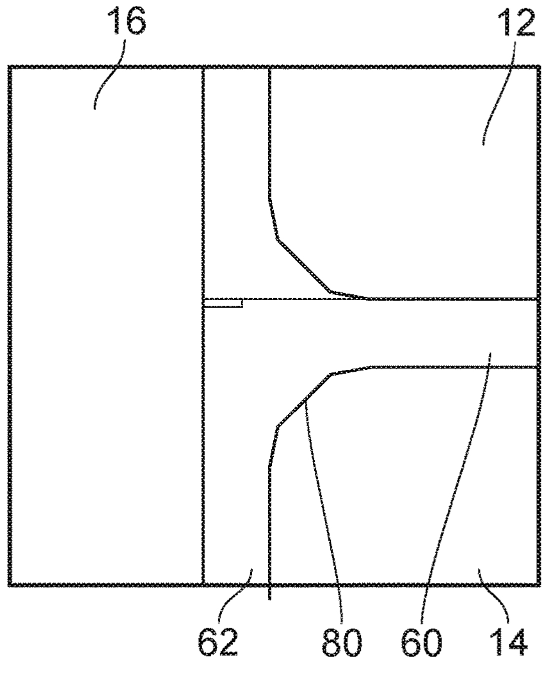

As a second example, FIGS. 8*a* and 8*b* illustrate the shell stators 12, 14 in accordance with a further alternative example.

In this example, the shell stator 14 comprises a multi-faceted portion 80 at the interfaces between the first seal groove 60 and the second seal groove 62. In this example, there are multiple discrete surfaces disposed between the first seal groove 60 and the second seal groove 62. Thus, the first and second seal grooves 60, 62 are distinct from one another, and are discrete rather than continuous. Although in this example, the multi-faceted portion 80 comprises three distinct surfaces, it will be appreciated by those skilled in the art that the multi-faceted portion 80 may comprise a different number of facets or surfaces, e.g. more than or less than three.

This multi-faceted portion 80 tends to be relatively easy to manufacture, e.g. by machining.

An equivalent multi-faceted portion may be provided in the opposing shell stator 12.

Figures 9A, 9B, 10A, 10B:
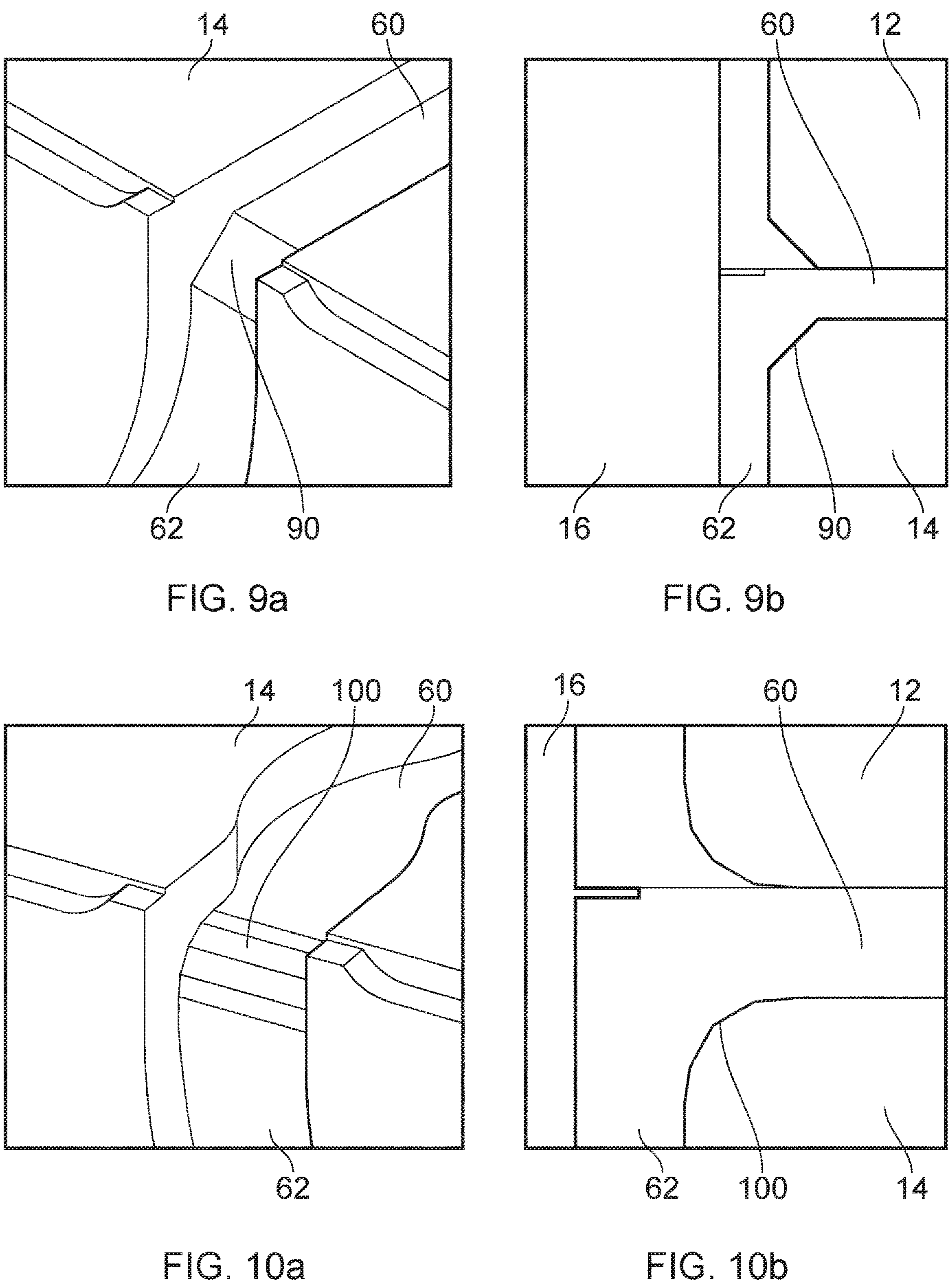
FIGS. 9*a* and 9*b* are schematic illustrations (not to scale) showing a portion of an alternative shell stator for the housing.
FIGS. 10*a* and 10*b* are schematic illustrations (not to scale) showing a portion of an alternative shell stator for the housing.

As a third example, FIGS. 9*a* and 9*b* illustrate the shell stators 12, 14 in accordance with a yet further alternative example.

In this example, the shell stator 14 comprises only a single planar surface portion 90 at an interface between the first seal groove 60 and the second seal groove 62. The single planar surface portion 90 may be considered to be a chamfer or chamfered transition between the first seal groove 60 and the second seal groove 62. The first and second seal grooves 60, 62 are distinct from one another, and are discrete rather than continuous.

This single planar surface portion 90 tends to be relatively easy to manufacture, e.g. by machining.

An equivalent single planar surface portion may be provided in the opposing shell stator 12.

As a fourth example, FIGS. 10*a* and 10*b* illustrate the shell stators 12, 14 in accordance with a further alternative example.

In this example, the shell stator 14 comprises a multi-faceted portion 100 at the interfaces between the first seal groove 60 and the second seal groove 62. In this example, there are multiple discrete surfaces disposed between the first seal groove 60 and the second seal groove 62. Thus, the first and second seal grooves 60, 62 are distinct from one another, and are discrete rather than continuous. Although in this example, the multi-faceted portion 100 comprises four distinct surfaces, it will be appreciated by those skilled in the art that the multi-faceted portion 100 may comprise a different number of facets or surfaces, e.g. more than or less than four. By having more facets, the multi-faceted portion 100 may approximate a curved surface while being easier to manufacture.

This multi-faceted portion 80 tends to be relatively easy to manufacture, e.g. by machining.

An equivalent multi-faceted portion may be provided in the opposing shell stator 12.

Figure 11A:
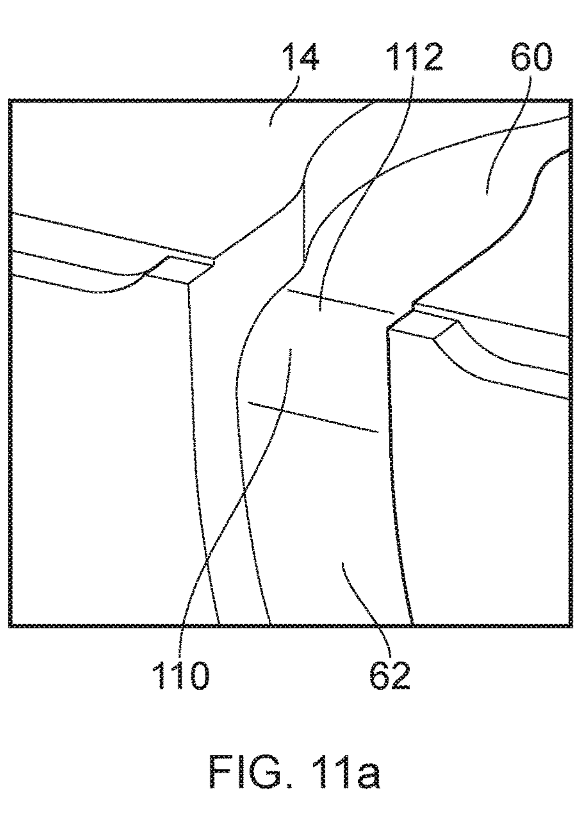
FIGS. 11*a* and 11*b* are schematic illustrations (not to scale) showing a portion of an alternative shell stator for the housing.
Figure 11B:
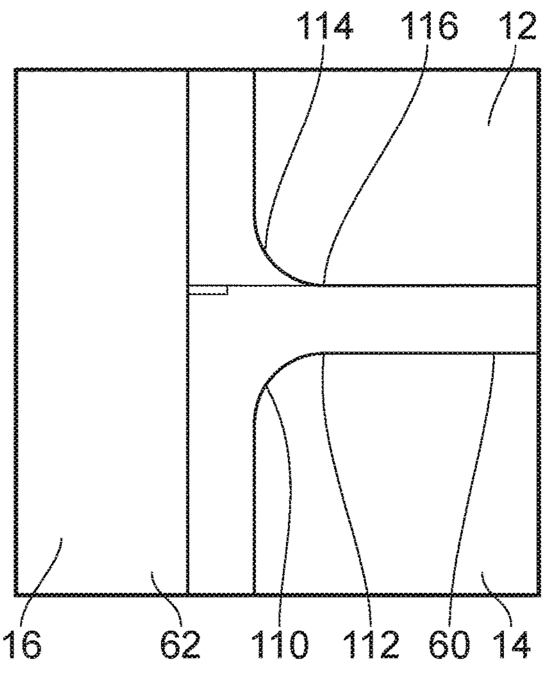

As a fifth example, FIGS. 11*a* and 11*b* illustrate the shell stators 12, 14 in accordance with an alternative example.

In this example, the shell stator 14 comprises a curved surface portion 110 and a planar surface portion 112 at the interfaces between the first seal groove 60 and the second seal groove 62. The curved surface portion 70 provides a degree of continuity between the recessed surfaces (e.g. the flat bottoms) of the seal grooves 60, 62. The planar surface portion 112 is disposed between the curved surface portion 110 and the first seal groove 60.

Also in this example, the shell stator 12 may comprise a seal groove at its end face for receiving an annular sealing member. This seal groove comprises a curved surface portion 114 and a planar surface portion 116 at the interface between the seal groove and the joining face of the shell stator 12. The planar surface portion 116 is disposed between the curved surface portion 114 and the joining surface of the shell stator 12.

Use of one or both of the planar surface portions 112, 116 may provide improved contact between the sealing gasket 20 and the housing 10, and thus improved sealing.

Figure 12A:
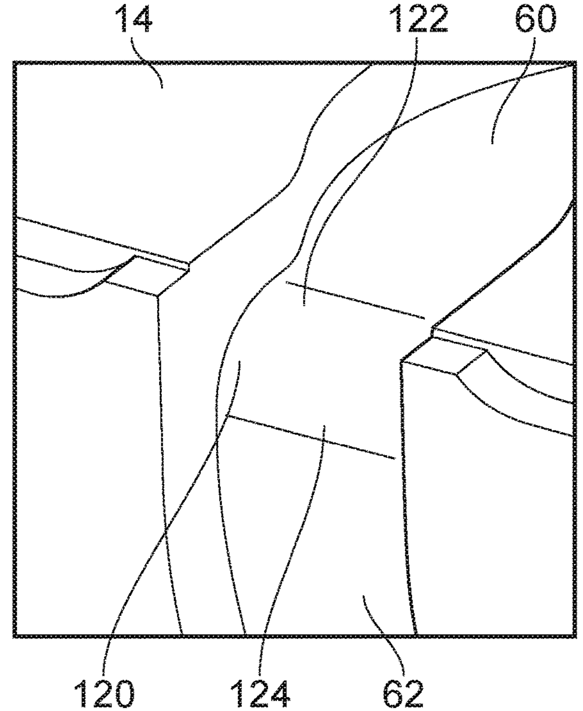
FIGS. 12*a* and 12*b* are schematic illustrations (not to scale) showing a portion of an alternative shell stator for the housing.
Figure 12B:
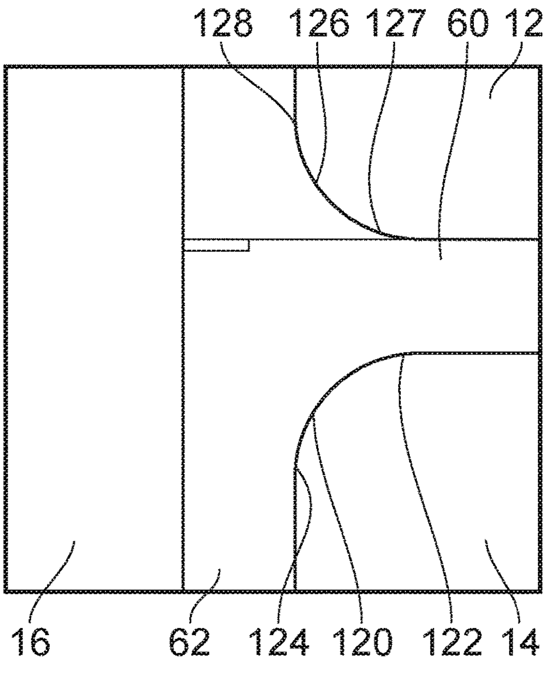

As a sixth example, FIGS. 12*a* and 12*b* illustrate the shell stators 12, 14 in accordance with an alternative example.

In this example, the shell stator 14 comprises a curved surface portion 120 and two planar surface portions 122, 124 at the interfaces between the first seal groove 60 and the second seal groove 62. The curved surface portion 120 provides a degree of continuity between the recessed surfaces (e.g. the flat bottoms) of the seal grooves 60, 62. A first planar surface portion 122 is disposed between the curved surface portion 120 and the first seal groove 60. A second planar surface portion 124 is disposed between the curved surface portion 120 and the second seal groove 62.

Also in this example, the shell stator 12 may comprise a seal groove at its end face for receiving an annular sealing member. This seal groove comprises a curved surface portion 126 and two planar surface portions 127, 128 at the interface between the seal groove and the joining face of the shell stator 12. Planar surface portion 127 is disposed between the curved surface portion 126 and the joining surface of the shell stator 12. Planar surface portion 128 is disposed between the curved surface portion 126 and the seal groove at the end face of the shell stator 12.

Use one or more of the planar surface portions 122, 124, 127, 128 may provide improved contact between the sealing gasket 20 and the housing 10, and thus improved sealing.

Figure 13:
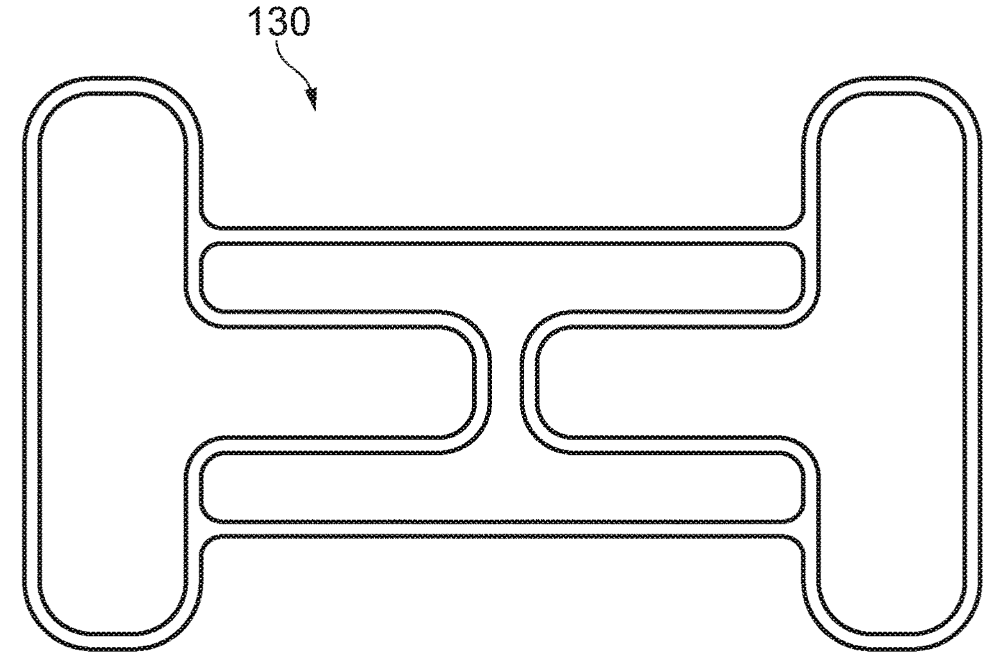
FIG. 13 is a schematic illustration (not to scale) showing an alternative mould cavity for the sealing gasket.
Figure 14:
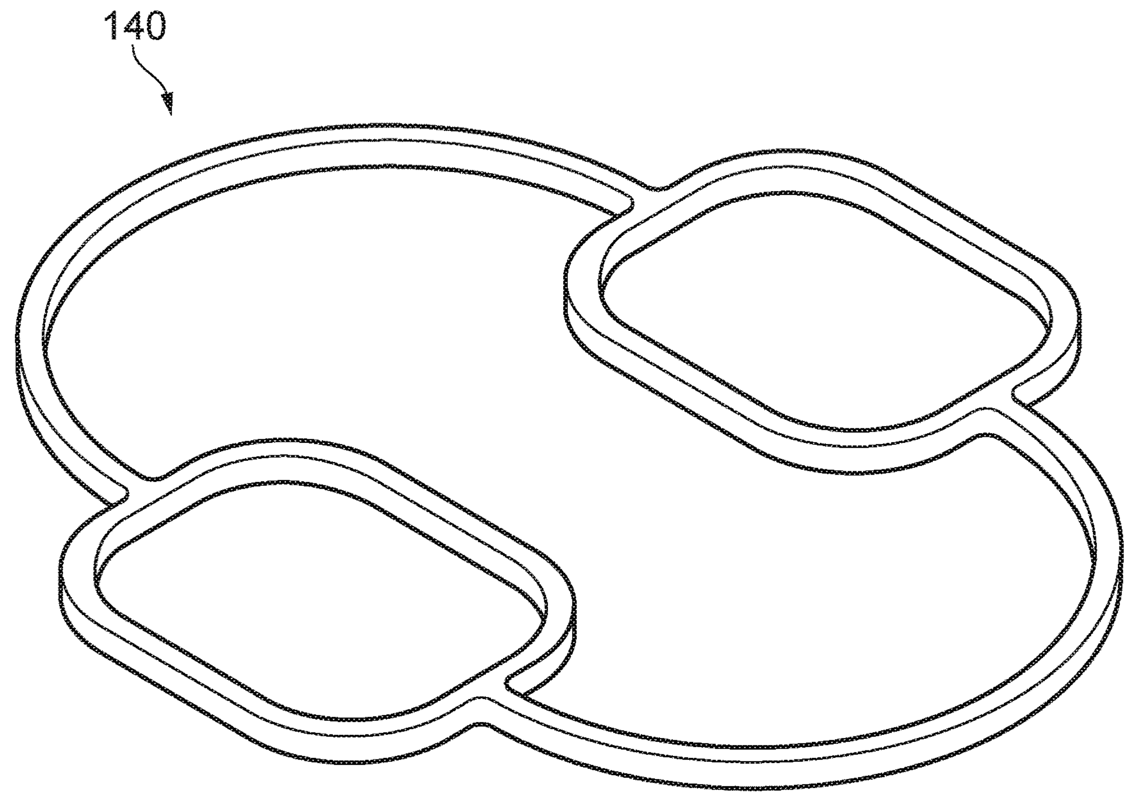
FIG. 14 is a schematic illustration (not to scale) showing an alternative mould cavity for the sealing gasket.

In the above examples, the sealing gasket may be manufactured by moulding as a single-piece, as a substantially planar or flat item as shown in FIG. 2. However, in other examples, the sealing gasket may be manufactured in a different way, for example by moulding as a single-piece, as a substantially planar or flat item as shown in FIG. 13 (see single-piece, substantially planar or flat gasket 130) or FIG. 14 (see single-piece, substantially planar or flat gasket 140).

In some examples, the sealing gasket comprises annular sealing members that, in use, seal against the end plates. However, these sealing members may have shape other than strictly annular. The sealing members define closed shapes, and may define closed shapes other than annuluses such as loops, rings, ellipses, ovals, rounded squares or rounded rectangles (i.e., squares or rectangles with rounded corners), squircles, or rounded polygons.

An example in which the sealing members that, in use, seal against the end plates define rounded squares, i.e. substantially squircles, will now be described.

Figure 15:
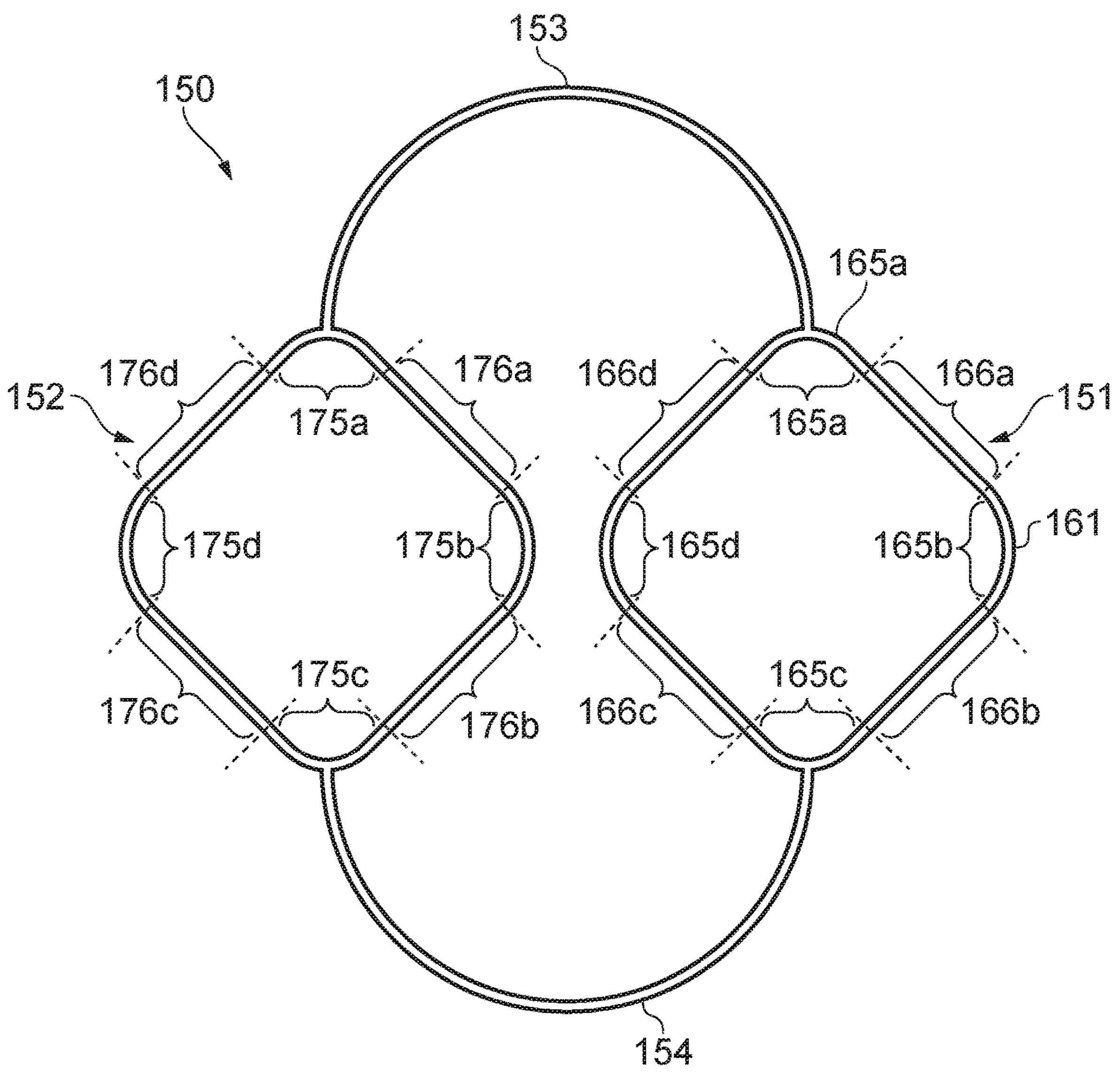
FIG. 15 is a schematic illustration (not to scale) of a top view of a further sealing gasket.
Figure 16:
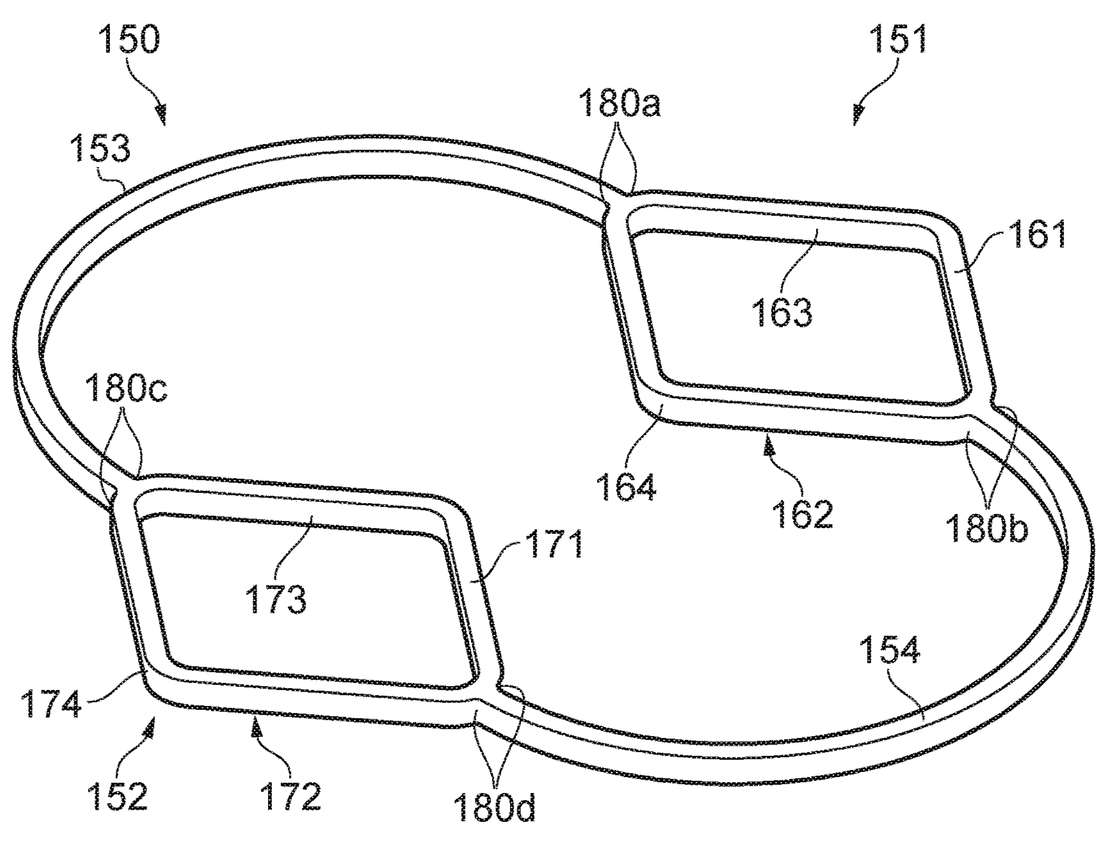
FIG. 16 is a schematic illustration (not to scale) of a perspective view of the further sealing gasket.

FIGS. 15 and 16 are schematic illustrations (not to scale) of a further sealing gasket 150 for sealing the housing 10, according to one example.

The sealing gasket 150 comprises a first sealing member 151, a second annular sealing member 152, a first longitudinal sealing member 153, and a second longitudinal sealing member 154.

The first sealing member 151 defines a closed shape. In particular, in this example, the first sealing member 151 defines a rounded square, i.e. a square with rounded corners, or substantially a squircle, The first sealing member 151 comprises a first rounded square surface 161, a second rounded square surface 162 opposite the first rounded square surface 161, a first inner surface 163, and a first outer surface 164 opposite to the first inner surface 163. The first inner surface 163 and the first outer surface 164 are disposed between the first rounded square surface 161 and the second rounded square surface 162.

The first sealing member 151 comprises a first curved section 165*a*, a second curved section 165*b*, a third curved section 165*c*, a fourth curved section 165*d*, a first substantially straight section 166*a* disposed between the first curved section 165*a* and the second curved section 165*b*, a second substantially straight section 166*b* disposed between the second curved section 165*b* and the third curved section 165*c*, a third substantially straight section 166*c* disposed between the third curved section 165*c* and the fourth curved section 165*d*, and a fourth substantially straight section 166*d* disposed between the fourth curved section 165*d* and the first curved section 165*a*. The first longitudinal sealing member 153 is connected to the first curved section 165*a*. The second longitudinal sealing member 154 is connected to the third curved section 165*c*.

The second sealing member 152 defines a closed shape. In particular, in this example, the second sealing member 152 defines a rounded square, i.e. a square with rounded corners, or substantially a squircle, The second sealing member 152 comprises a third rounded square surface 171, a fourth rounded square surface 172 opposite the third rounded square surface 171, a second inner surface 173, a second outer surface 174 opposite to the second inner surface 173. The second inner surface 173 and the second outer surface 174 are disposed between the third rounded square surface 171 and the fourth rounded square surface 172.

The second sealing member 152 comprises a fifth curved section 175*a*, a sixth curved section 175*b*, a seventh curved section 175*c*, an eighth curved section 175*d*, a fifth substantially straight 176*a* section disposed between the fifth curved section 175*a* and the sixth curved section 175*b*, a sixth substantially straight section 176*b* disposed between the sixth curved section 175*b* and the seventh curved section 175*c*, a seventh substantially straight section 176*c* disposed between the seventh curved section 175*c* and the eighth curved section 175*d*, and an eighth substantially straight section 176*d* disposed between the eighth curved section 175*d* and the fifth curved section 175*a*. The first longitudinal sealing member 153 is connected to the fifth curved section 175*a*. The second longitudinal sealing member 154 is connected to the seventh curved section 175*c*.

The first longitudinal sealing member 153 is connected or attached between the first outer surface 164 (of the first sealing member 151) and the second outer surface 174 (of the second sealing member 152).

The second longitudinal sealing member 154 is connected or attached between the first outer surface 164 (of the first sealing member 151) and the second outer surface 174 (of the second sealing member 152).

The second longitudinal sealing member 154 is arranged opposite to the first longitudinal sealing member 153. That is to say, the second longitudinal sealing member 154 is connected to the first and second sealing members 151, 152 and at an opposite side of the first and second sealing members 151, 152 to the side at which the first longitudinal sealing member 153 is connected to the first and second sealing members 151, 152.

The first seal member 151 has a square or rectangular cross-section. The second seal member 152 has a square or rectangular cross-section.

The first longitudinal sealing member 153 may be an O-ring cord. The first longitudinal sealing member 153 may have a square or rectangular cross-section.

The second longitudinal sealing member 154 may be an O-ring cord. The second longitudinal sealing member 154 may have a square or rectangular cross-section.

In this example, the sealing gasket 150 is a continuous one-piece sealing gasket.

In this example, the sealing gasket 150 comprises curved surface portions 180*a-d* at the interfaces between the rounded square sealing members 151, 152 and the longitudinal sealing members 153, 154. These may be similar or the same as the curved surface portions 48*a-d* described in more detail earlier above with reference to FIG. 2.

The sealing gasket 150 is made of a deformable or flexible material, such as an elastomer material (e.g. a fluoroelastomers (FKM/FPM) or a perfluoroelastomer (FFKM)) or silicon, such that the sealing gasket 150 is deformable or flexible. Thus, the sealing gasket 150 may be deformed into a desired shape or configuration suitable for use as a seal for the housing 10.

The sealing gasket 150 may be installed into the housing 10, for example as described in more detail earlier above with reference to FIG. 4. In this way, the first and second longitudinal sealing members 153, 154 may be disposed in sealing engagement with the shell stators 12, 14, which may be clamped together to compress the longitudinal sealing members 153, 154. Also, the rounded square sealing members 151, 152 may be located in closed-shape seal grooves located in the shell stators 12, 14 and/or the end plates 16, 18. A seal groove may have any appropriate closed shape, such as an anulus, a circle, an oval, an ellipse, a stadium, a rounded square, a squircle, a rounded rectangle, a rounded polygon, etc.

Figure 17:
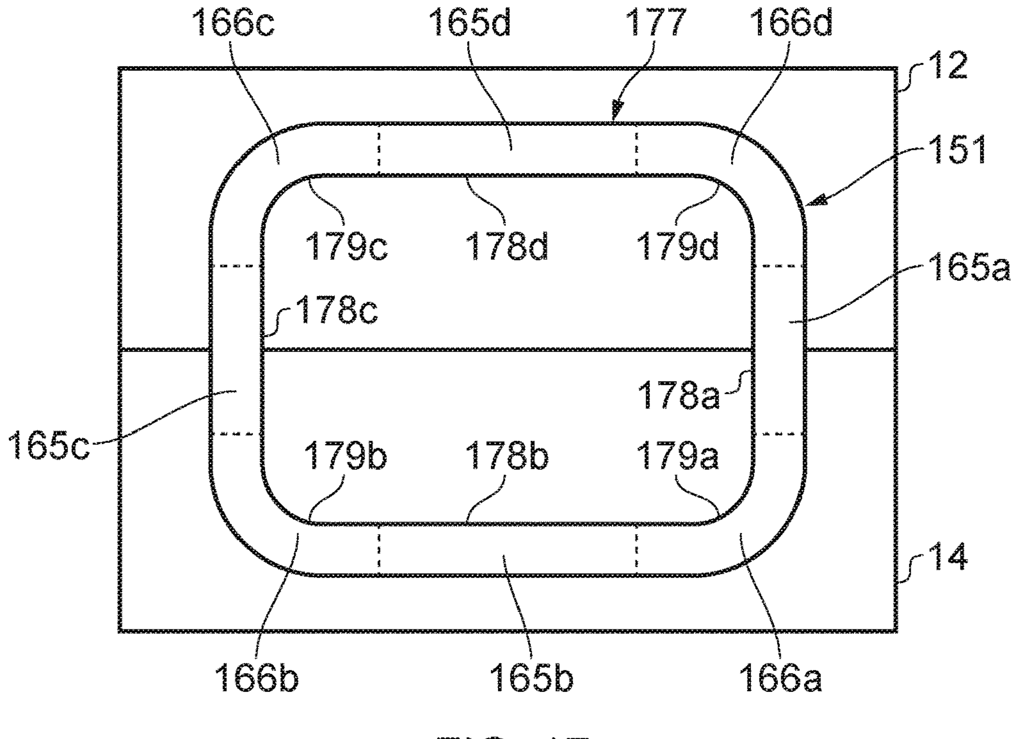
FIG. 17 is a schematic illustration (not to scale) showing a portion of the further sealing gasket disposed in a seal groove formed in the shell stators of the housing.

FIG. 17 is a schematic illustration (not to scale) showing the first sealing member 151 fitted into a closed-shape seal groove 177 located in the shell stators 12, 14. In this example, the seal groove 177 is define a rounded square or rounded rectangle. In this example, the second sealing member 152 may be fitted into substantially identical closed-shape seal groove 177 at the opposite end of the shell stators 12, 14.

In this example, the curved sections 165*a-d* of the first sealing member 151 are located in respective substantially straight portions of the seal groove 177. Also, the substantially straight sections 166*a-d* of the first sealing member 151 are located in respective curved portions of the seal groove 177.

In particular, the first curved section 165*a* is disposed in a first substantially straight portion 178*a* of the seal groove 177, the second curved section 165*b* is disposed in a second substantially straight portion 178*b* of the seal groove 177, the third curved section 165*c* is disposed in a third substantially straight portion 178*c* of the seal groove 177, the fourth curved section 165*d* is disposed in a fourth substantially straight portion 178*d* of the seal groove 177, the first substantially straight section 166*a* is disposed in a first curved portion 179*a* of the seal groove 177, the second substantially straight section 166*b* is disposed in a second curved portion 179*b* of the seal groove 177, the third substantially straight section 166*c* is disposed in a third curved portion 179*c* of the seal groove 177, and the fourth substantially straight section 166*d* is disposed in a fourth curved portion 179*d* of the seal groove 177.

As described above, the substantially rounded square sealing members being located in the rounded square sealing groove such that the curved sections of the rounded square sealing member are located in substantially straight portions of the seal groove, and such the substantially straight sections of the sealing member are located in curved portions of the seal groove 177. This advantageously tends to reduce stresses in the rounded square sealing members. In particular, compound bending and/or twisting of the sealing member when installing the sealing member in the seal groove tends to be reduced compared to other shapes of sealing member. This tends to improve seal life. Furthermore, retention of the sealing member within the seal groove retention tends to be improved. For example, the reduced twisting and/or compound bending of the sealing member tends to reduce the sealing member twisting out of the seal groove.

Although illustrative examples of the disclosure have been disclosed in detail herein, with reference to the accompanying drawings, it is understood that the disclosure is not limited to the precise example and that various changes and modifications can be effected therein by one skilled in the art without departing from the scope of the disclosure as defined by the appended claims and their equivalents.

The invention claimed is:

1. A sealing gasket comprising:

a first sealing member defining a closed shape, comprising:

a first surface;

a second surface opposite the first surface;

a first inner surface; and a first outer surface opposite to the first inner surface, wherein the first inner surface and the first outer surface are disposed between the first surface and the second surface;

a second sealing member defining a closed shape, comprising:

a third surface;

a fourth surface opposite the third annular surface;

a second inner surface; and a second outer surface opposite to the second inner surface, wherein the second inner surface and the second outer surface are disposed between the third surface and the fourth surface;

a first longitudinal sealing member connected between the first outer surface and the second outer surface; and a second longitudinal sealing member connected between the first outer surface and the second outer surface, wherein the sealing gasket is a one-piece, moulded, deformable gasket and all of the sealing gasket has a constant square or rectangular cross-section.

2. The sealing gasket of claim 1, wherein:

the first sealing member defines a rounded square or rounded rectangle;

the first surface is a rounded square or rounded rectangle shaped surface; and the second surface is a rounded square or rounded rectangle shaped surface.

3. A sealing gasket comprising:

a first sealing member defining a closed shape of a rounded square or rounded rectangle, comprising:

a first surface that is a rounded square or rounded rectangle shaped surface;

a second surface opposite the first surface, wherein the second surface is a rounded square or rounded rectangle shaped surface;

a first inner surface; and a first outer surface opposite to the first inner surface, wherein the first inner surface and the first outer surface are disposed between the first surface and the second surface, wherein:

the first sealing member comprises:

a first curved section;

a second curved section;

a third curved section;

a fourth curved section;

a first substantially straight section disposed between the first curved section and the second curved section;

a second substantially straight section disposed between the second curved section and the third curved section;

a third substantially straight section disposed between the third curved section and the fourth curved section; and a fourth substantially straight section disposed between the fourth curved section and the first curved section;

a second sealing member defining a closed shape, comprising:

a third surface;

a fourth surface opposite the third surface;

a second inner surface; and a second outer surface opposite to the second inner surface, wherein the second inner surface and the second outer surface are disposed between the third surface and the fourth surface;

a first longitudinal sealing member connected between the first outer surface and the second outer surface, wherein the first longitudinal sealing member is connected to the first curved section; and a second longitudinal sealing member connected between the first outer surface and the second outer surface, wherein the second longitudinal sealing member is connected to the third curved section.

4. The sealing gasket of claim 1, wherein:

the second sealing member defines a rounded square or rounded rectangle;

the third surface is a rounded square or rounded rectangle shaped surface; and the fourth surface is a rounded square or rounded rectangle shaped surface.

5. A sealing gasket comprising a first sealing member defining a closed shape, comprising:

a first surface;

a second surface opposite the first surface;

a first inner surface; and a first outer surface opposite to the first inner surface, wherein the first inner surface and the first outer surface are disposed between the first surface and the second surface;

a second sealing member defining a closed shape of a rounded square or rounded rectangle, comprising:

a third surface that is a rounded square or rounded rectangle shaped surface;

a fourth surface opposite the third surface, wherein the fourth surface is a rounded square or rounded rectangle shaped surface;

a second inner surface; and a second outer surface opposite to the second inner surface, wherein the second inner surface and the second outer surface are disposed between the third surface and the fourth surface;

wherein:

the second sealing member comprises:

a fifth curved section;

a sixth curved section;

a seventh curved section;

an eighth curved section;

a fifth substantially straight section disposed between the fifth curved section and the sixth curved section;

a sixth substantially straight section disposed between the sixth curved section and the seventh curved section;

a seventh substantially straight section disposed between the seventh curved section and the eighth curved section; and an eighth substantially straight section disposed between the eighth curved section and the fifth curved section;

a first longitudinal sealing member connected between the first outer surface and the second outer surface, wherein the first longitudinal sealing member is connected to the fifth curved section; and a second longitudinal sealing member connected between the first outer surface and the second outer surface, wherein the second longitudinal sealing member is connected to the seventh curved section.

6. The sealing gasket of claim 1, wherein the sealing gasket is an elastomer.

7. The sealing gasket of claim 1, wherein the sealing gasket is included in a vacuum pump, the vacuum pump comprising:

shell stators defining at least one pumping chamber; and end pieces mountable at either end of the shell stator.

8. The sealing gasket of claim 7, wherein:

the first sealing member is disposed in a first seal groove;

the first sealing member comprises:

a first curved section, a second curved section, a third curved section, a fourth curved section, a first substantially straight section disposed between the first curved section and the second curved section, a second substantially straight section disposed between the second curved section and the third curved section, a third substantially straight section disposed between the third curved section and the fourth curved section, and a fourth substantially straight section disposed between the fourth curved section and the first curved section, and wherein:

the first longitudinal sealing member is connected to the first curved section; and the second longitudinal sealing member is connected to the third curved section, and wherein:

the first curved section is disposed in a first substantially straight portion of the first seal groove;

the second curved section is disposed in a second substantially straight portion of the first seal groove;

the third curved section is disposed in a third substantially straight portion of the first seal groove;

the fourth curved section is disposed in a fourth substantially straight portion of the first seal groove;

the first substantially straight section is disposed in a first curved portion of the first seal groove;

the second substantially straight section is disposed in a second curved portion of the first seal groove;

the third substantially straight section is disposed in a third curved portion of the first seal groove; and the fourth substantially straight section is disposed in a fourth curved portion of the first seal groove.

9. The sealing gasket of claim 7, wherein:

the second sealing member is disposed in a second seal groove;

the second sealing member comprises:

a fifth curved section, a sixth curved section, a seventh curved section, an eighth curved section, a fifth substantially straight section disposed between the fifth curved section and the sixth curved section, a sixth substantially straight section disposed between the sixth curved section and the seventh curved section, a seventh substantially straight section disposed between the seventh curved section and the eighth curved section, and an eighth substantially straight section disposed between the eighth curved section and the fifth curved section, and wherein:

the first longitudinal sealing member is connected to the fifth curved section, and the second longitudinal sealing member is connected to the seventh curved section, and wherein the fifth curved section is disposed in a first substantially straight portion of the second seal groove;

the sixth curved section is disposed in a second substantially straight portion of the second seal groove;

the seventh curved section is disposed in a third substantially straight portion of the second seal groove;

the eighth curved section is disposed in a fourth substantially straight portion of the second seal groove;

the fifth substantially straight section is disposed in a first curved portion of the second seal groove;

the sixth substantially straight section is disposed in a second curved portion of the second seal groove;

the seventh substantially straight section is disposed in a third curved portion of the second seal groove; and the eighth substantially straight section is disposed in a fourth curved portion of the second seal groove.

10. The sealing gasket of claim 1, comprising curved surface portions arranged at interfaces between the first and second outer surfaces of the first and second sealing members and the first and second longitudinal sealing members to provide a smooth continuous transition between the outer surfaces and the longitudinal sealing members connected thereto.

11. The sealing gasket of claim 1, wherein the first and second longitudinal sealing members are connected between facing axially inner faces of the first and second sealing members.

* * * * *